Sept. 22, 1964     A. SAFIANOFF     3,149,757
MEANS LOCKING VALVE ACTUATING MECHANISM
AGAINST ACCIDENTAL OPERATION
Filed Oct. 10, 1961
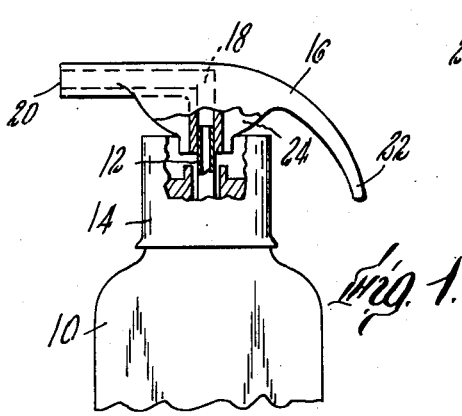
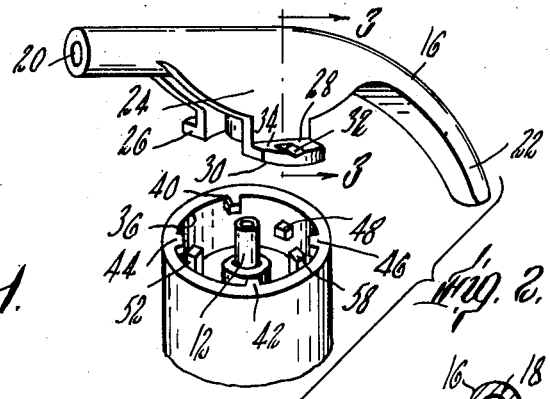
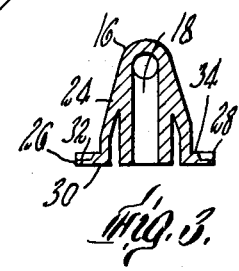
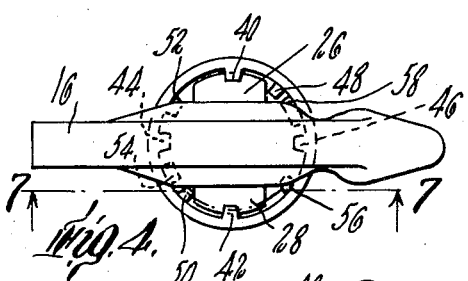
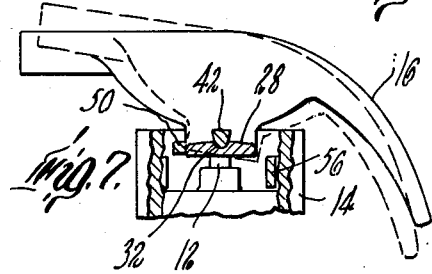
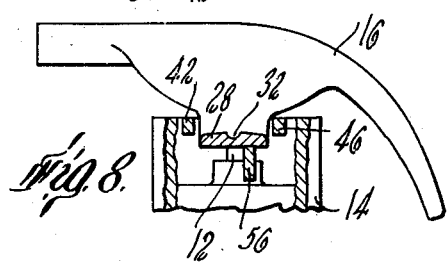
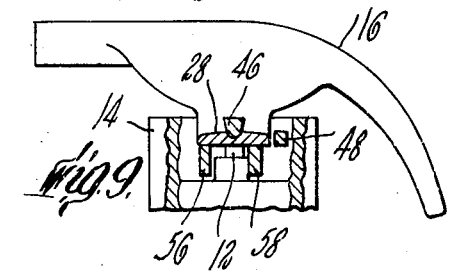
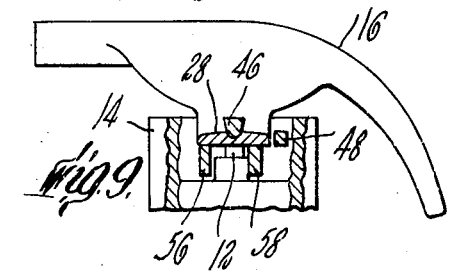
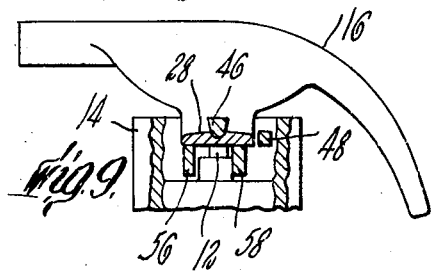

United States Patent Office 3,149,757
Patented Sept. 22, 1964

3,149,757
MEANS LOCKING VALVE ACTUATING MECHANISM AGAINST ACCIDENTAL OPERATION
Albert Safianoff, Chicago, Ill., assignor to The Gillette Company, Boston, Mass., a corporation of Delaware
Filed Oct. 10, 1961, Ser. No. 144,105
10 Claims. (Cl. 222—153)

This invention relates to pressurized fluid containers and more particularly to an improved apparatus for securing the actuating mechanism of such containers.

In the handling of pressurized fluid containers, as in shipping, it is essential to prevent accidental valve actuation and resulting release of the contained fluid. It is also important to provide a structure which prevents the accidental removal of the actuator from the valve stem and the possible loss which would render the container useless when the container reaches the ultimate consumer. While valve actuators are in general frictionally secured to the valve structure and certain types of valve actuators may be easily protected with a cover, the tiltable type of valve often has a comparatively large actuator handle which can be adequately protected with a suitable and economical type of cover only with difficulty and which because of its size is comparatively easy to inadvertently remove.

Accordingly, an object of this invention is to provide an improved means for securing the valve actuator to a pressurized fluid container.

Another object of the invention is to provide a novel and improved locking apparatus which positively prevents actuation of the valve.

Another object of the invention is to provide a novel and improved pressurized fluid container valve actuator securing apparatus which, in a first position positively prevents actuation of the valve and which, in a second position, secures the actuator to the container while enabling reliable operation of the valve.

In accordance with the preferred embodiment of the invention, there is provided a pressurized fluid container having a valve structure and a fitting comprising an annular collar including an upstanding cylindrical wall portion which surrounds the valve structure. Disposed on the cylindrical wall portion are a plurality of support members that extend radially inwardly therefrom. A cooperating locking member, also extending radially inwardly from the wall portion, is disposed above an associated support member at a predetermined distance therefrom. A valve actuator, adapted to cooperate with a portion of the valve structure so that tilting movement of the actuator operates the valve to release fluid from said container, is positioned on the valve structure adjacent the annular collar and carries a pair of radially extending flanges that extend radially toward the collar and which are adapted to cooperate with the support members and locking members. The width of each flange is such that the actuator may be positioned relative to the collar with the flanges located in the plane between the support and locking members, and each flange has a thickness so that it may be slid between a support member and the cooperating locking member. The actuator is rotatable relative to said collar from a first position where the actuator may be moved to operate the valve to a second position in which each flange is positioned between a support member and the adjacent cooperating locking member so that movement of the valve by said actuator to open the valve and release fluid from said container is inhibited. In the disclosed embodiment of the invention, actuator locating stops are positioned in the plane between the support and locking members and limit rotation of the actuator between the locked position and an operative position at which the actuator may be controllably tilted to operate the valve and release pressurized fluid. An actuator assembly position is located intermediate the locked position and the operative position. The invention thus enables secure locking of the actuator in one position and controlled operation of the valve in a second position in a simple, reliable and inexpensive construction.

Other objects, features and advantages of the invention will be seen as the following description of a preferred embodiment thereof progresses in conjunction with the drawings, in which:

FIG. 1 is a side elevational view, in partial section, of the novel valve actuator member and cooperating collar arrangement according to a preferred embodiment of the invention associated with a pressurized fluid container;

FIG. 2 is a perspective view of the valve actuator member and cooperating locking collar;

FIG. 3 is a sectional view of the actuator member along the line 3—3 of FIG. 2;

FIG. 4 is a top plan view of the actuator and cooperating collar in valve operating position;

FIG. 5 is a top plan view of the actuator and cooperating collar in the assembly position, the actuator being rotated 45° counter-clockwise from the position of FIG. 4;

FIG. 6 is a top plan view of the actuator and cooperating collar in locked position, the actuator being rotated 45° counter-clockwise from the position of FIG. 5; and FIGS. 7, 8 and 9 are corresponding views taken along the lines 7—7 of FIG. 4, 8—8 of FIG. 5, and 9—9 of FIG. 6, respectively, of the actuator and cooperating collar showing the various positions in partial section.

The pressurized fluid container 10 shown in FIG. 1 has a tiltable type valve assembly in which the valve stem or outlet 12 is shown. As this valve may be a conventional assembly, well known in the art, details of it are not shown. An annular collar 14 is frictionally secured to the valve structure and the container so that the valve stem is located concentrically within the collar. Positioned on the valve stem is actuator member 16 which includes a connector channel 18 for the flow of pressurized fluid released when the valve is opened, an orifice 20 through which the pressurized fluid is ejected, and a handle portion 22 which is pressed to tilt the valve stem and actuate the valve to release the pressurized fluid for flow through the channel 18 and orifice 20. The actuator also includes a depending wall 24 on either side of the channel 18 which is spaced from the channel body. Each wall has a radially outwardly extending flange 26, 28 extending from the lower portion thereof which has a smooth lower surface 30 and a notch 32 in the upper surface 34 thereof.

The cooperating locking collar 14 has a plurality of supporting, positioning, and locking members which extend radially inwardly from the interior wall 36 of the collar. These members are located at three different levels. At the top level there are four spaced tabs 40, 42, 44 and 46. These tabs are equidistantly spaced about the interior circumference of the annular collar wall 36. At the intermediate level are two positioning or locating stop members 48, 50 which are located on opposite sides of the collar wall and between the adjacent upper tabs. At the lower level are a set of four support members 52, 54, 56 and 58. Only a portion of these members may be seen in the perspective view of FIG. 2, the location of all the members spaced around the interior circumference of the collar being visible in FIGS. 4, 5 and 6.

In FIGS. 4 and 7 the actuator handle 16 is shown in the operating position, in FIGS. 5 and 8 it is shown in the assembly position, and in FIGS. 6 and 9 it is shown in the locked position. It will be noted that in each position the flanges 26 and 28 cooperate with different levels of collar tabs to position or guide the actuator for control of the desired operation. The flanges 26 and 28 are dimensioned in width so that they will fit between the tabs 40, 44 and 42, 46 as indicated in FIG. 5 to permit mounting of the actuator onto the valve so that the lower surfaces 30 of the flanges are seated on supports 52, 56. It will be noted that the stops 48, 50 at the intermediate level prevent the actuator flanges from being seated on any supports between tabs 40, 46 and 42, 44 if assembly should be attempted with the actuator rotated 90° from the position shown in FIG. 5. When properly positioned as indicated in FIG. 5, the flange 26 is supported by support 52 and the flange 28 is supported by support 56 as indicated in FIG. 8.

When the actuator is rotated 45° in a clockwise direction to the position shown in FIG. 4, the lower surfaces of the flanges ride across the supports until the upper flange surfaces 34 are cammed under the tilt control tabs 40 and 42. Rotation is continued until the notches 32 are engaged with the tabs 40, 42, as shown in FIG. 4. In this position the front edge of flange 28 abuts stop 50 and the rear edges of flange 26 abuts stop 48. The lower surfaces of the flanges are not supported in this position, and the actuator may be tilted forwardly or rearwardly to tilt the valve stem 12 and open the valve so that release of the fluid from the container is permitted. Although the actuator frictionally engages the valve stem, it may under some circumstances slide down the stem and seat on the top of the valve structure. Whenever this occurs the pressure of the released fluid when the valve is next opened forces the actuator up until the flanges 26, 28 engage the resilient tabs 40, 42. This is the normal operating position, and in this position the actuator flanges are secured underneath the resilient tabs as positioned by the coacting grooves and the stops 48, 50.

The actuator 16 may be rotated 90° counterclockwise from the operating position through the assembly position shown in FIG. 5 to the locked position shown in FIG. 6. In this position the notches 32 of the flanges 26, 28 engage beneath the tabs 44, 46 respectively, as shown in FIGS. 6 and 9, with the lower surface 30 of flange 26 being supported by supports 52 and 54 and the lower surface of flange 28 being supported by supports 56 and 58 so that tilting of the valve actuator to open the valve is positively prevented. In this position the front edge of flange 26 abuts stop 50 and the rear edge of flange 28 abuts stop 48.

Thus it will be seen that the invention provides a simple and economical arrangement for securing and guiding an actuator, an arrangement which includes a collar structure secured on the container surrounding a cooperating removable valve actuator. In one position of the valve actuator relative to the collar, used during shipping periods for example, the actuator is locked in inoperative position. The actuator may be rotated relative to the collar to a second or operative position in which the actuator, while remaining secured to the collar, may be manipulated to actuate the valve and release fluid from the container. In an intermediate position between the operative position and the locked position, an assembly position is provided where the actuator may be easily removed from the valve structure by a straight pull axially or longitudinally of the valve.

While a preferred embodiment of the invention has been shown and described, various modifications therein will be obvious to those skilled in the art; and therefore it is not intended that the invention be limited to the disclosed embodiment or to details thereof, and departures may be made therefrom within the spirit and scope of the invention as defined in the claims.

What is claimed is:

1. A pressurized fluid container having a normally closed valve outlet, an actuator mounted on said valve outlet for moving the same to open position, a fitting secured to said container adjacent said actuator, said fitting and said actuator being rotatable relative to each other and carrying interengaging locking means, said interengaging locking means including first elements that in a first position of relative rotation lock said actuator against opening valve movement and against removal from said valve outlet, and second elements that in a second position of relative rotation lock said actuator against removal from said valve outlet but permit movement of said actuator for valve opening movement, said first and second elements being disposed so that a third position of relative rotation is provided in which said actuator may be manually removed from said valve outlet.

2. In combination a pressurized fluid container having a valve structure therein, a valve actuator adapted to mate with a portion of said valve structure so that movement thereof actuates said valve structure to release fluid from said container, said actuator including a nozzle orifice and a connector portion providing communication between said valve structure and said nozzle orifice, an annular collar surrounding said valve structure having an upstanding cylindrical wall portion with a support member extending radially from said wall portion, a cooperating locking member extending radially from said wall portion in a plane above said support member and spaced a predetermined distance therefrom, a radially extending flange on said valve actuator adaptor to cooperate with said support and locking members, the width of said flange being dimensioned so that the actuator may be positioned relative to said collar with said flange located in the plane between said support and locking members, and the thickness of said flange being such that said flange may slide between a support member and the cooperating locking member, said actuator being rotatable relative to said collar from a first position where said actuator may be moved to operate said valve structure to a second position where said flange is positioned between said support member and said cooperating locking member such that movement of the valve structure by said actuator to open said valve structure and release fluid from said container is inhibited.

3. In combination a pressurized fluid container having a valve structure therein, a valve actuator adapted to mate with a portion of said valve structure so that tilting movement thereof actuates said valve structure to release fluid from said container, said actuator including a nozzle orifice and a connector portion providing communication between said valve structure and said nozzle orifice, an annular collar surrounding said valve structure having an upstanding cylindrical wall portion with a plurality of support members extending radially from said wall portion, the upper surfaces of said support members being disposed in a plane perpendicular to the axis of said annular collar, a pair of locking members extending radially from said wall portion in a plane above cooperating support members and spaced a predetermined distance therefrom, a cooperating tilt control member extending radially from said wall portion in the plane of said locking members and spaced a predetermined distance therefrom, said valve actuator having a pair of radially extending flanges, the width of said flanges being dimensioned so that the actuator may be positioned relative to said collar with the lower surface of each flange located in the plane between support and locking members and seated on the upper surface of at least one of said support members, and the thickness of each said flange being such that each flange may slide between a support member and the cooperating locking member, said actuator being rotatable relative to said collar between a first position where a flange is positioned beneath said tilt control member so that said actuator may be controllably tilted to operate said valve structure and a second position where the pair of flanges are positioned between the locking members and the cooperating support members such that movement of the valve structure by said actuator to open said valve structure and release fluid from said container is inhibited.

4. In combination a pressurized fluid container having a valve structure therein, a valve actuator adapted to mate with a portion of said valve structure so that movement thereof actuates said valve structure to release fluid from said container, said actuator including a nozzle orifice and a connector portion providing communication between said valve structure and said orifice, an annular collar surrounding said valve structure having an upstanding cylindrical wall portion with a plurality of support members extending radially inwardly from said wall portion, the upper surface of said support members being disposed in a plane perpendicular to the axis of said collar, a pair of cooperating locking members disposed on opposite sides of said collar and extending radially inwardly from said wall portion, each locking member being adapted to cooperate with a pair of support members and spaced a predetermined distance above the plane of said cooperating support members, said valve actuator including a pair of flanges extending radially outwardly from opposite sides of said actuator and being adapted to cooperate with said support and locking members, the width of each flange being dimensioned so that the actuator may be positioned relative to said collar with each flange located in the plane between said cooperating support and locking members and seated on the upper surface of at least one support member, each said flange having a thickness substantially equal to the distance between the plane of said support members and the cooperating locking members so that each said flange may be positioned between a pair of support members and the cooperating locking member, said actuator being rotatable relative to said collar from a first position where said actuator may be moved to operate said valve structure to a second position where each said flange is positioned between a pair of support members and the adjacent cooperating locking member so that movement of the valve structure by said actuator to open said valve structure and release fluid from said container is inhibited.

5. The combination as claimed in claim 4 and further including a stop member extending radially inwardly from said collar wall and disposed in the plane between said support members and said locking members in a position adjacent a support member so that a portion of a flange abuts said stop member when said actuator is in said second position to control the permissible rotation of said actuator.

6. The combination as claimed in claim 4 wherein each said flange has a groove in the upper surface thereof adapted to receive said locking member when said actuator is in said second position.

7. In combination a pressurized fluid container having a tiltable valve structure therein, a valve actuator adapted to mate with a portion of said valve structure so that tilting movement thereof actuates said valve structure to release fluid from said container, said actuator including a nozzle orifice and a connector portion providing communication between said valve structure and said orifice, an annular collar surrounding said valve structure having an upstanding cylindrical wall portion with a plurality of support members extending radially inwardly from said wall portion, the upper surface of said support members being disposed in a plane perpendicular to the axis of said collar, a pair of cooperating locking members disposed on opposite sides of said collar and extending radially inwardly from said wall portion, each locking member being adapted to cooperate with a pair of support members and spaced a predetermined distance above the plane of said cooperating support members, a pair of inwardly extending tilt control members disposed on opposite sides of said collar spaced equidistantly from said locking members, said valve actuator including a pair of flanges extending radially outwardly from opposite sides of said actuator and being adapted to cooperate with said support and locking members, each said flange having a groove in the upper surface thereof and a substantially flat lower surface, the width of each flange being dimensioned so that the actuator may be positioned relative to said collar with the lower surface of each said flange positioned on at least one of said support members, each said flange having a thickness substantially equal to the distance between the plane of said support members and the cooperating locking members so that each said flange may be positioned between a pair of support members and the cooperating locking member with said locking member resiliently engaged in the groove in the flange, said actuator being rotatable relative to said collar from an operative position where said actuator flanges are engaged by said tilt control members and said actuator may be tiltably moved to operate said valve structure through an assembly position where said actuator may be removed from said valve structure to a locked position where each said flange is positioned between a pair of support members and the adjacent cooperating locking member with the locking member firmly engaged in said groove so that movement of said valve structure by the actuator to open said valve structure and release fluid from said container is inhibited.

8. The combination as claimed in claim 7 and further including a pair of oppositely disposed stop members extending radially inwardly from said collar wall and disposed in the plane between said support members and said locking members in a position adjacent a support member so that a portion of each flange abuts each said stop member when said actuator is in said operative or locked positions to control the permissible rotation of said actuator.

9. A pressurized fluid container having a normally closed valve outlet openable by tilting movement away from its normal position,
an actuator slidably mounted on said valve outlet for tilting the same to open said valve outlet,
a fitting secured to said container adjacent said actuator and disposed in rotatable relation relative to said actuator,
first control elements of said fitting and said actuator being in interengaging relation when said fitting is in a first position relative to said actuator to lock said actuator against removal from said valve outlet while allowing tilting movement of said actuator,
said fitting and said actuator carrying a plurality of control elements adapted to interengage one another,
and at least one additional control element of said fitting and said actuator being in interengaging relation when said fitting is in a second position relative to said actuator to lock said actuator against tilting movement and against removal from said valve outlet,
said fitting and said actuator having a third position relative to one another in which said control elements release said actuator for sliding removal from said valve outlet under manually applied force.

10. A pressurized fluid container having a normally closed valve openable by movement away from its normal position,
an actuator mounted on said container for movement to open said valve and having a control element secured thereto,
a plurality of control elements secured to said container adjacent said actuator and disposed in rotatable relation relative to said actuator,
said control elements being adapted to interengage one another,
first control elements of said container and said actuator being in interengaging relation when said container is in a first position relative to said actuator to lock said actuator against removal from said container while allowing movement of said actuator to open said valve, and at least one additional control element of said container and said actuator being in interengaging relation when said container is in a second position relative to said actuator to lock said actuator against movement and against removal from said container, said container and said actuator having a third position relative to one another in which said control elements release said actuator for removal from said container under manually applied force.

References Cited in the file of this patent

UNITED STATES PATENTS

| | | |
|---|---|---|
| 2,557,245 | Tuttle et al. | Dec. 4, 1951 |
| 2,706,660 | Johnson et al. | Apr. 19, 1955 |
| 2,887,273 | Anderson et al. | May 19, 1959 |
| 2,975,943 | Miles et al. | Mar. 21, 1961 |
| 3,018,929 | Obst | Jan. 30, 1962 |

UNITED STATES PATENT OFFICE
CERTIFICATE OF CORRECTION

Patent No. 3,149,757                      September 22, 1964

Albert Safianoff

It is hereby certified that error appears in the above numbered patent requiring correction and that the said Letters Patent should read as corrected below.

Column 8, line 3, for "2,557,245" read -- 2,577,245 --.

Signed and sealed this 12th day of January 1965.

(SEAL)
Attest:

ERNEST W. SWIDER
Attesting Officer

EDWARD J. BRENNER
Commissioner of Patents